United States Patent [19]
Bantz et al.

[11] Patent Number: 5,519,706
[45] Date of Patent: May 21, 1996

[54] DYNAMIC USER REGISTRATION METHOD IN A MOBILE COMMUNICATIONS NETWORK

[75] Inventors: David Bantz, Chappaqua, N.Y.; Frederic Bauchot, Saint-Jeannet, France; Eliane D. Bello, Jardim Flamboyant Campinas, Brazil; Shay Kutten, Rockaway, N.J.; Hugo Krawczyk, Riverdale, N.Y.

[73] Assignee: International Business Machines Corporation, Armonk, N.Y.

[21] Appl. No.: 267,689

[22] Filed: Jun. 28, 1994

[30] Foreign Application Priority Data

Dec. 3, 1993 [EP] European Pat. Off. .............. 93480210

[51] Int. Cl.$^6$ ..................................................... H04J 3/02
[52] U.S. Cl. ........................ 370/85.3; 370/94.1; 455/56.1
[58] Field of Search ........................... 370/60, 85.1, 85.2, 370/85.3, 85.7, 85.13, 94.1, 94.3, 95.1, 95.3, 85.6; 340/825.5, 825.51, 825.02, 825.03; 455/1, 33.1, 33.2, 53.1, 54.1, 54.2, 56.1

[56] References Cited

U.S. PATENT DOCUMENTS 5,159,592 10/1992 Perkins .................................... 370/85.7

Primary Examiner—Douglas W. Olms
Assistant Examiner—Dang Ton
Attorney, Agent, or Firm—Stephen T. Keohane; Homer L. Knearle

[57] ABSTRACT

In a communications system comprising a number of base stations, each base station communicating over a shared communication channel with a plurality of registered stations and controlling the network cell formed by said plurality of registered stations, a method is described for dynamically registering and deregistering mobile stations. Each station owns a unique address and is allocated a local identifier at registration time. Each network cell owns a unique cell identifier known to all registered stations belonging to this network cell. Base stations manage cell members data uniquely associating the unique address and the local identifier corresponding to each one of the mobile stations belonging to their network cell. A registration request is sent to a selected base station by a registering mobile station, comprising the unique cell identifier of the network cell controlled by the selected base station and the unique address of the registering mobile station; the selected base station detects in its cell members data any conflicting registered station whose unique address matches the unique address of the registering mobile station and sends an address check packet to any conflicting registered station, comprising the unique address of the conflicting registered station, its local identifier and the identifier of the network cell it controls. A receiving registered mobile station sends to the selected base station, an acknowledgement to the address check packet if its unique address, the local identifier of its owning base station and its network cell identifier all match with the ones carried by the address check packet. The selected base station rejects the registration request it it receives an acknowledgement to its address check packet. The same address check packet is used to deregister inactive stations.

18 Claims, 11 Drawing Sheets

DYNAMIC USER REGISTRATION METHOD IN A MOBILE COMMUNICATIONS NETWORK

TECHNICAL FIELD

The present invention generally relates to communications methods and, in particular, to a method for registering and deregistering mobile users in a communications network.

BACKGROUND OF THE INVENTION

In data communications systems generally, and particularly in wireless data communications systems such as cellular radio frequency (RF) and infrared systems, the control of the transmission activities within a cell can be either distributed or centralized. This control is important when the medium (e.g. radio or infrared) must be shared among the inhabitants of the cell. Sharing may be by time-multiplexing, frequency-multiplexing, or code-division multiplexing of various kinds. There may be resources associated with the cell in addition to the transmission medium: for example, attachment to a wired backbone network, storage, or locally administered identifiers.

In distributed control, inhabitants of the cell cooperate by executing an algorithm, usually common to all. An example is carrier-sense multiple-access (CSMA), where all cell inhabitants follow a conditional procedure before transmitting. A description of the principles of such CSMA protocols will be found in section 26-20 of Reference Data for Engineers, 7th edition, SAMS (1991).

In centralized control, one inhabitant of the cell (here called the base station) provides information to the other inhabitants (here called mobiles) to coordinate their use of cell resources. For example, the base station may allocate frequency channels to mobile stations, or may specify times at which a mobile station can transmit. An advantage of centralized control is that because the base station maintains precise knowledge about the allocation state of cell resources, it can optimize the use of those resources to a greater degree than can a distributed control algorithm.

The base station maintains explicit knowledge of the identity of mobile stations that require its services. Such knowledge is used for a number of reasons including: efficient addressing and explicitly directed transfer of information to mobile stations so that battery power can be conserved, bandwidth allocation, routing and handoff as stations move across cells, and effective network management and control of mobile stations.

The process by which a mobile station introduces itself to the base station of its choice is called registration. The mobile station registers with a base station that will be referred to as its owner. The owner base station is responsible for providing the mobile station with access to the communication system. The set of mobile stations owned by a base station is called a network cell.

U.S. Pat. No. 5,159,592 describes a method for managing communication between a wired network and mobile communication units in which a network entity, called global gateway, maintains a plurality of network addresses. In response to a request from a mobile communication unit, the global gateway assigns one network address to the requesting mobile unit. The global gateway also buffers and routes data being directed to an address corresponding to the assigned network address, to the mobile communication unit having the assigned address.

U.S. Pat. No. 4,797,948 describes a communication system having a communication channel for transmitting data between a base station and a plurality of mobile radio units, wherein each radio unit has a unique identification code (ID) and wherein transmission from each radio unit to the base station include the unit's ID Code. A method for identifying which units are within RF communication proximity of a base station comprises the steps of, 1) transmitting a range message, including a low ID code parameter and a high ID code parameter, from the base station over the channel to elicit a response from at least one of the radio units having an ID code between the low and high parameters, 2) storing in an ID list a signal representative of the respective ID code assigned to radio units responsive to the range message. These steps are repeated with different transmitted range messages until each of the radio units within RF proximity of the base station is appended to the ID list.

U.S. Pat. No. 5,123,029 describes a hybrid of controlled access and random access schemes using frequency hopping spread spectrum communication techniques, implemented in an indoor digital data radio communication system between mobile stations and a computer system. A hop in the frequency hopping spread spectrum communications system is subdivided into two intervals so that different media-access protocols can be used in each interval. The protocol uses a centralized control scheme in one interval and a decentralized scheme in the other.

Radio frequency propagation channel is characterized by the presence of specific propagation phenomenons such as black-out zones, capture effects or fading conditions. These characteristics, combined with;the need to handle mobile stations, constantly entering or quitting network cells, require that robust and dynamic registration and deregistration methods be used.

SUMMARY OF THE INVENTION

It is therefore an object of the present invention to provide a method for dynamically registering stations and more specifically mobile stations in a communications system using a shared communication channel.

The communications system comprises a number of base stations, each base station communicating over the shared communication channel with a plurality of mobile stations and controlling the network cell formed by this plurality of mobile stations. In the method of the present invention:

each mobile station owns a unique address and is allocated a local identifier at registration time, each network cell owns a unique cell identifier known to all mobile stations belonging to this network cell, each base station manages cell members data uniquely associating the unique address and the local identifier corresponding to each one of the plurality of mobile station;

The method of the invention comprises the steps of:
1. send a registration request from a registering mobile station to a selected base station, said registration request comprising the unique cell identifier of the network cell controlled by said selected base station and the unique address of said registering mobile station;
2. upon reception of said registration request at said selected base station, detect in said cell members data any conflicting registered mobile station whose said unique address matches the unique address of said registering mobile station;

3. if no conflicting registered mobile station is detected, accept said registration request, allocate a local identifier to said registering mobile station and add the unique address and the local identifier of said registering mobile station to said cell members data;
4. if a conflicting registered mobile station is detected, send an address check packet from said selected base station to said conflicting registered mobile station, said address check packet comprising in a first field the unique address of said conflicting registered mobile station, in a second field the local identifier of said conflicting registered mobile station and in a third field the identifier of the network cell controlled by said selected base station.
5. upon reception of said address check packet at a receiving registered mobile station:
   a. compare said first, second and third fields respectively with the unique address, the local identifier and the network cell identifier of said receiving registered mobile station;
   b. if all of said first, second and third fields match, send an acknowledgement to said address check packet, from said receiving registered mobile station to said selected base station; and
   c. if either of said first, second or third field does not match, ignore said address check packet.
   a. reject said registration request upon reception at said selected base station of an acknowledgement to said address check packet from said receiving registered mobile station.

Another object of the invention is to provide a method for dynamically deregistering a mobile station in the same communications system. The method of this other aspect of the invention comprises the steps of:
1. detect inactive registered mobile stations;
2. send an address check packet from the owner base station controlling the network cell of said inactive registered mobile stations, said address check packet comprising in a first field the unique address of said inactive registered mobile station, in a second field the local identifier of said inactive registered mobile station and in a third field the identifier of the network cell of said inactive registered mobile station.
3. upon reception of said address check packet at a receiving registered mobile station:
   a. compare said first, second and third fields respectively with the unique address, the local identifier and the network cell identifier of said receiving registered mobile station;
   b. if all of said first, second and third fields match, send an acknowledgement to said address check packet, from said receiving registered mobile station to said owner base station; and
   c. if either of said first, second or third field does not match, ignore said address check packet.
4. deregister said inactive registered mobile station if said owner base stations does not receive any acknowledgement to said address check packet after a number of retries.

DESCRIPTION OF THE FIGURES

The foregoing and other objects, aspects and advantages will be better understood from the following detailed description of a preferred embodiment of the invention with reference to the drawing, in which.

DESCRIPTION OF THE INVENTION

Figure 1:
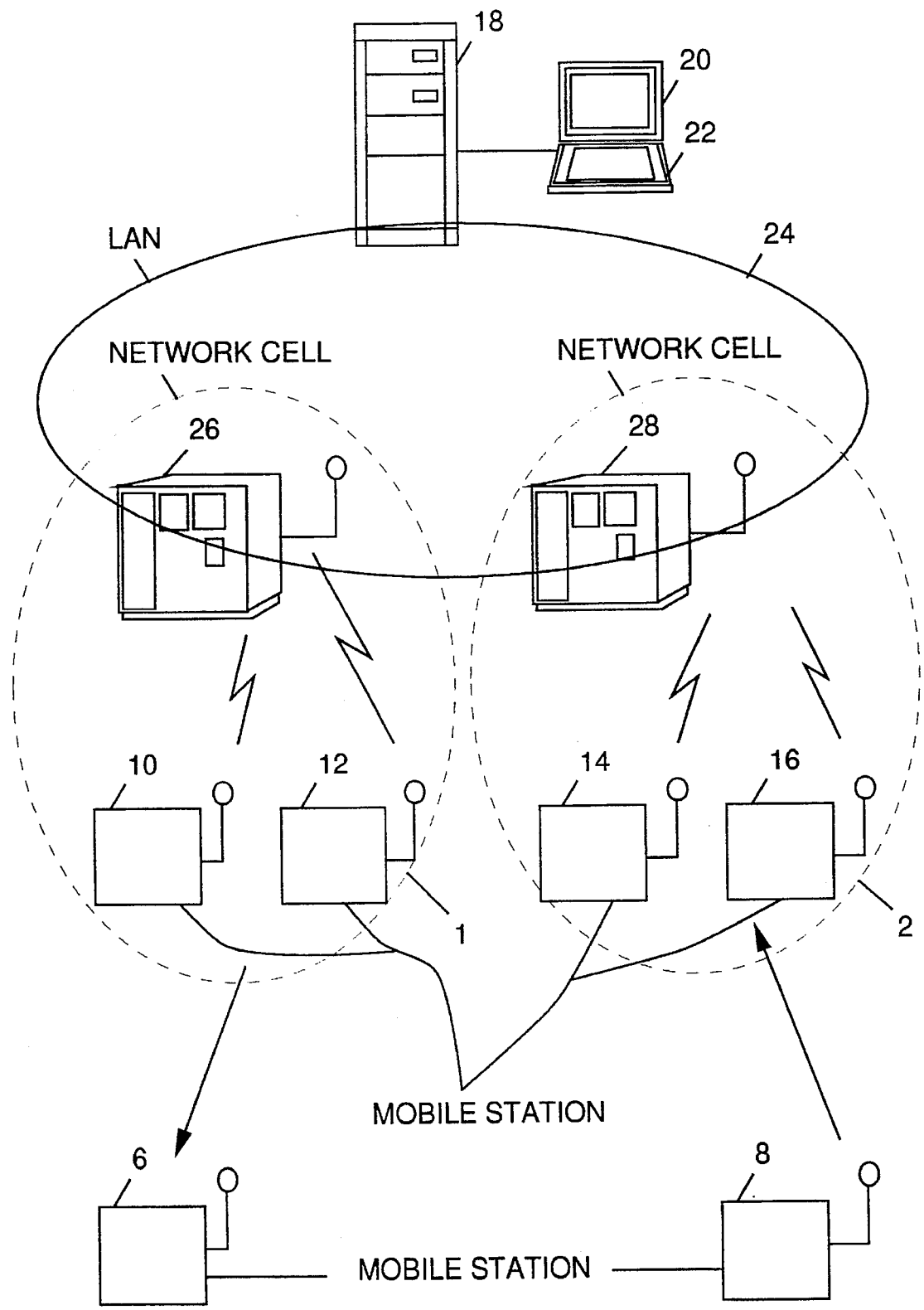
FIG. 1 is a pictorial diagram showing an indoor radio digital data communication system of the type in which the invention is implemented.

Referring now to the drawing, and more particularly to FIG. 1, there is shown an indoor radio system allowing communication between a plurality of mobile stations 6, 8, 10, 12, 14 and 16 and applications and data residing in a computing system. The computing system typically includes a server 18, with attached monitor 20 and keyboard 22, of a local area network (LAN), generally indicated by reference numeral 24, having a plurality of attached workstations or personal computers (not shown for simplicity). Also attached to the LAN are one or more base stations 26 and 28 with which the mobile stations 6, 8, 10, 12, 14 and 16 communicate, using a common radio channel. Each one of the base stations 26 and 28 controls a network cell comprising the mobile stations it is communicating with. Network cell 1 is controlled by base station 26 and comprises mobile stations 10 and 12; mobile station 6 is moving out of network cell 1. Network cell 2 is controlled by base station 28 and comprises mobile stations 14 and 16; mobile station 8 is first opening and intends to register to network cell 2.

Each network cell is identified by a cell identifier CELLid. A logical network may consist of one or several network cells identified by different cell identifiers. Each logical network is identified by a unique network identifier NETid. Several logical networks may coexist in a given geographical area and their respective base stations may be attached to the same LAN or to different physical LAN's. Each logical network is managed in such a way that all network cells belonging to a given logical network are assigned different cell identifiers. However, since logical networks are managed independently one from another, two different network cells belonging to two different logical networks may be assigned the same cell identifier CELLid. Consequently, in the case of colocated logical networks, the identification of a given network cell has to be based both on the NETid of the logical network it belongs to and on the CELLid it has been assigned in its logical network. In addition, a given network cell comprises a base station and a number of mobile stations which are all assigned local identifiers. It should be noted that the presence of a wired LAN is not necessary to carry out the present invention and is only illustrative of the environment in which this particular embodiment of the invention is going to be described.

The local identifier of a mobile station is uniquely associated to its Medium Access Control (MAC) address by the base station controlling the network cell the mobile station belongs to. Such a MAC address can be either a Universally Administered MAC address or a locally administered MAC address. In this particular embodiment of the invention, it is assumed that a Universally Administered MAC address is used. It should be realized that any unique station address could be used instead of the Universally Administered MAC address. For more information on Universally Administered MAC addresses, see for instance "Local Area Networks Concepts and Products" IBM International Technical Support Centers, document number GG24-3178-02.

Figure 1A:
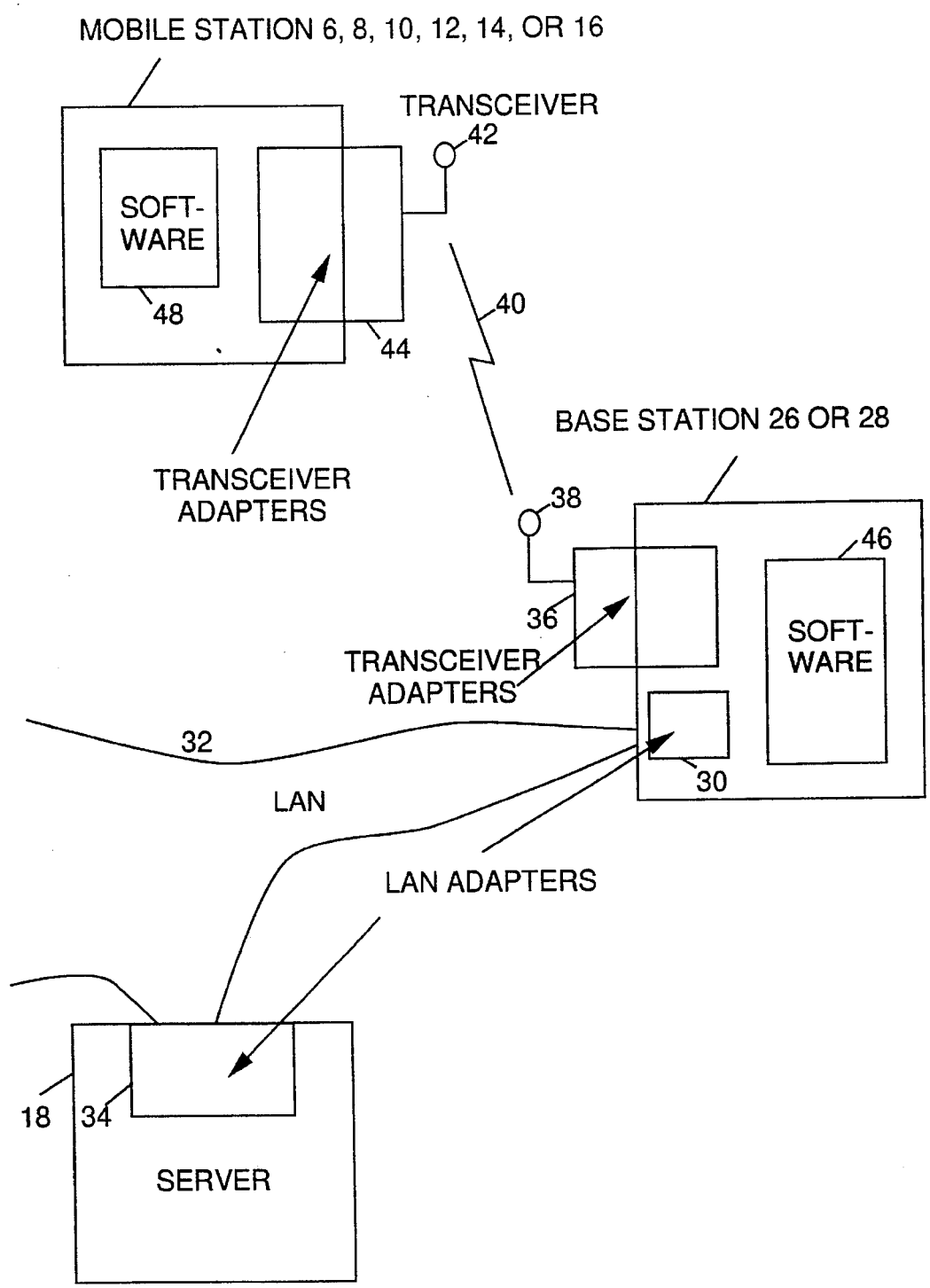
FIG. 1A is a block diagram of the system shown in FIG. 1 illustrating the basic components of a mobile station and a base station.

As shown in more detail in FIG. 1A, a base station 26 or 28, which may be a conventional microcomputer, has a LAN adapter 30 inserted in a bus slot and connected to LAN cabling 32. The server 18, typically also a conventional microcomputer and including one or more direct access storage devices (DASDs) such as hard disks (not shown), also has a LAN adapter 34 inserted in a bus slot and connected to LAN cabling 32. The LAN adapters 30 and 34 and the LAN cabling 32 together with LAN software constitute the LAN 24. The LAN 24 is of conventional design and does not form part of the invention. The base station 26 or 28 also has an RF transceiver adapter 36 implemented as a printed circuit card which is inserted in a bus slot of the base station. The transceiver adapter 36 includes a spread spectrum transceiver of conventional design. The transceiver adapter 36 has an antenna 38 by which a radio link 40 is established with one or more mobile stations 6, 8, 10, 12, 14 or 16. The mobile station may itself be a hand held or lap top computer of conventional design, and, like the base station, it is provided with an antenna 42 and a transceiver adapter 44, also implemented as a printed circuit card which is inserted in a bus slot of the computer. The transceiver adapter 44, like transceiver adapter 36, includes a spread spectrum transceiver of similar design. The base station and the mobile stations are further provided with software, generally indicated by reference numerals 46 and 48, respectively, which support their respective transceiver adaptors.

One form of indoor data radio uses a transmission technique known as "spread spectrum", authorized by the U.S. Federal Communications Commission (FCC) in its regulations part 15.247, for use in certain frequency bands without user license. Spread spectrum communications offer several advantages including low density power spectra and interference rejection. There are several types of spread spectrum systems including direct sequence digital systems, frequency hopping systems, time hopping systems, pulsed frequency modulated (or chirp) systems, and various hybrids. Of these, the direct sequence digital systems and the frequency hopping systems are perhaps the more widely implemented. In a direct sequence digital system, a fast pseudo-random code generator is used to modulate slower digital data which, in turn, modulates a carrier. In a frequency hopping system, a coherent local oscillator is made to jump from one frequency to another under the influence of a pseudo-random code generator.

The subject invention may be implemented using either direct sequence digital or frequency hopping types of spread spectrum communications systems. A description of these and other types of spread spectrum communications systems may be found, for example, in Spread Spectrum Systems, 2nd Ed., by Robert C. Dixon, John Wiley & Sons (1984), and Spread Spectrum Communications, Vol. II, by M. K. Simon et al., Computer Science Press (1985).

Figure 2:
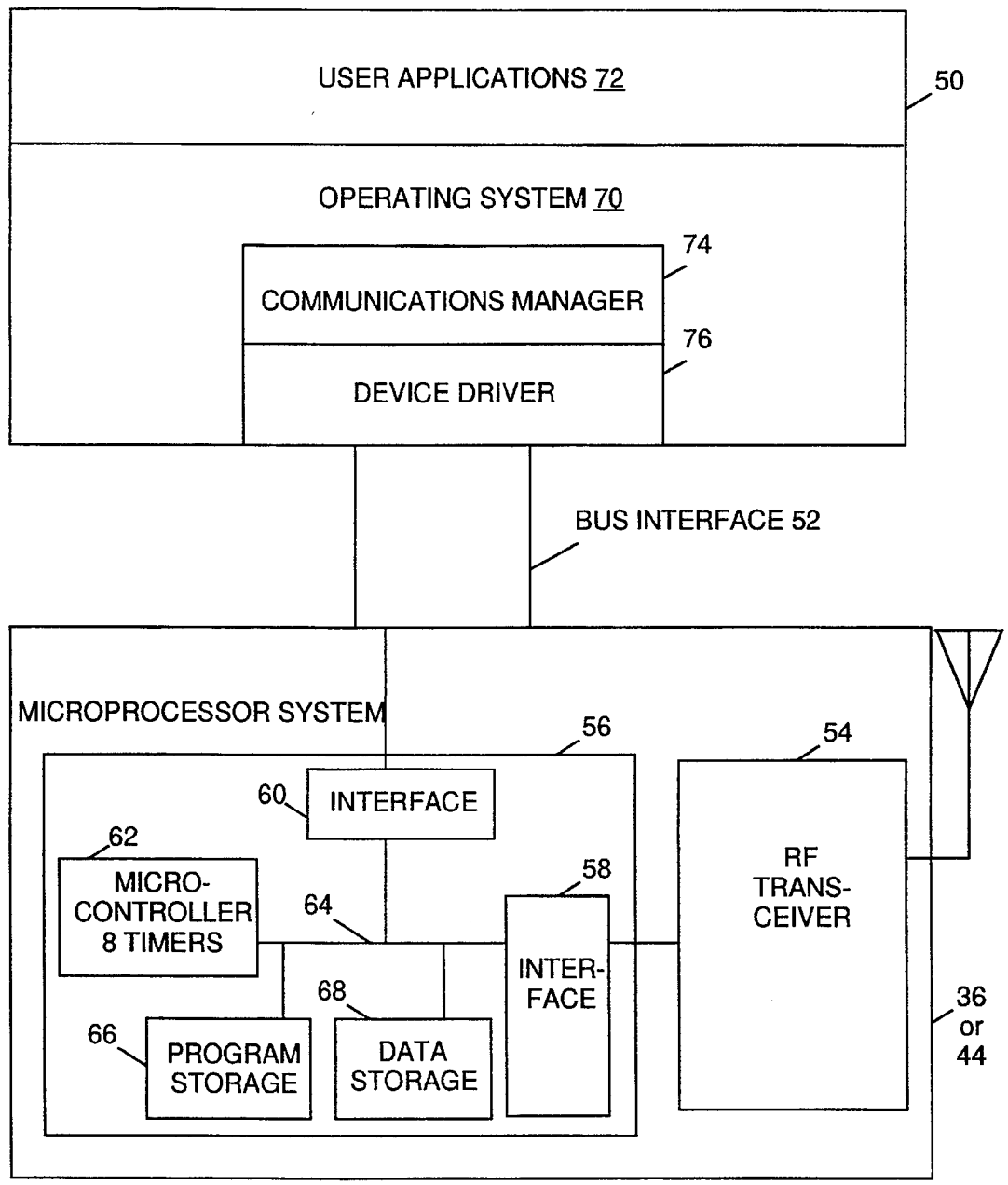
FIG. 2 is a block diagram of the radio system used in the implementation of a preferred embodiment of the invention.

FIG. 2 shows the radio system common to both the mobile stations and the base stations of FIG. 1. The radio system includes a transceiver adapter 36 or 44 connected to a computer 50 via the computer's bus interface 52. The transceiver section is itself divided into an RF transceiver 54 which may be a commercially available spread spectrum transceiver, and a dedicated microprocessor system 56 which controls the transceiver via an interface 58. The microprocessor system 56 further includes a system interface 60 which interfaces the transceiver section to the computer section 50. The microprocessor system includes a dedicated microprocessor 62 containing high-resolution time interval determination hardware or "timers" typical of real-time microprocessor systems.

Microprocessor 62 is connected by a memory bus 64 to program storage 66 and data storage 68 as well as to interfaces 58 and 60 providing attachment to RF transceiver 54 and bus interface 52, respectively. Program storage 66 is typically read only memory (ROM), while data storage 68 is static or dynamic random access memory (SRAM or DRAM).

The computer 50 runs an operating system 70 which supports one or more user application programs 72. The operating system 70 may include a communications manager 74, or the communications manager 74 may itself be an application program installed on the computer. In either case, the communications manager 74 controls a device driver 76 via the operating system 70. The device driver 76, in turn, communicates with the transceiver adapter 36 or 44 via bus interface 52.

When a data unit, designated as a "packet", is received from the device driver 76 by the microprocessor system 56, it is stored in data storage 68 and communicated to the RF transceiver 54 via interface 58 under control of serial channels and a direct memory access (DMA) controller (not shown) which is part of the microprocessor 62. The function of these serial channels is to encapsulate data and control information in an HDLC (high-level data link control) packet structure and provide the packet in serial form to the RF transceiver 54. For more information on the HDLC packet structure, see, for instance, Mischa Schwartz, Telecommunication Networks: Protocols, Modeling and Analysis, Addison-Wesley (1988).

When a packet is received through the RF transceiver 54, the serial channels check the packet destination address, check for errors, and deserialize the packet to data storage 68. The packet is then communicated to the device driver 76 via bus interface 52. The serial channels must have the capability to recognize a specific adaptor address as well as a broadcast address. Specific microprocessors with appropriate serial channel and timer facilities include the Motorola 68 or 69302 and the National Semiconductor HPC46500E microprocessors.

The HDLC addressing scheme used in this particular embodiment of the invention uses a one byte address field thus providing a pool of 255 addresses. This pool comprises is divided into several subsets comprising a subset for base station addresses and a subset for mobile stations addresses; in addition it comprises a dedicated address (REG@) used temporarily by registering mobile stations until they get registered and are allocated an address by their owner base station, and another dedicated address for broadcast messages (BROAD@).

Each base station manages a pool of mobile station addresses which are allocated to the mobile stations registering in the network cell it controls. Each base station in a given logical network is also assigned an HDLC address at network start-up time out of the base station addresses pool. In this particular embodiment of the invention it is assumed that these HDLC addresses are used as the mobile stations local identifiers. In addition it is also assumed that the HDLC address of a given base station is used as the network cell identifier CELLid of the network cell controlled by this base station. This arrangement is merely illustrative of the present invention, the man skilled in the art can easily devise other ways of defining local identifiers and network cell identifiers provided that, on one hand the local identifiers are uniquely associated, within the limits of a network cell, with the mobile stations belonging to this cell, and on the other hand, all the cell identifiers assigned to the network cells in a given logical network are unique.

Figure 2A:
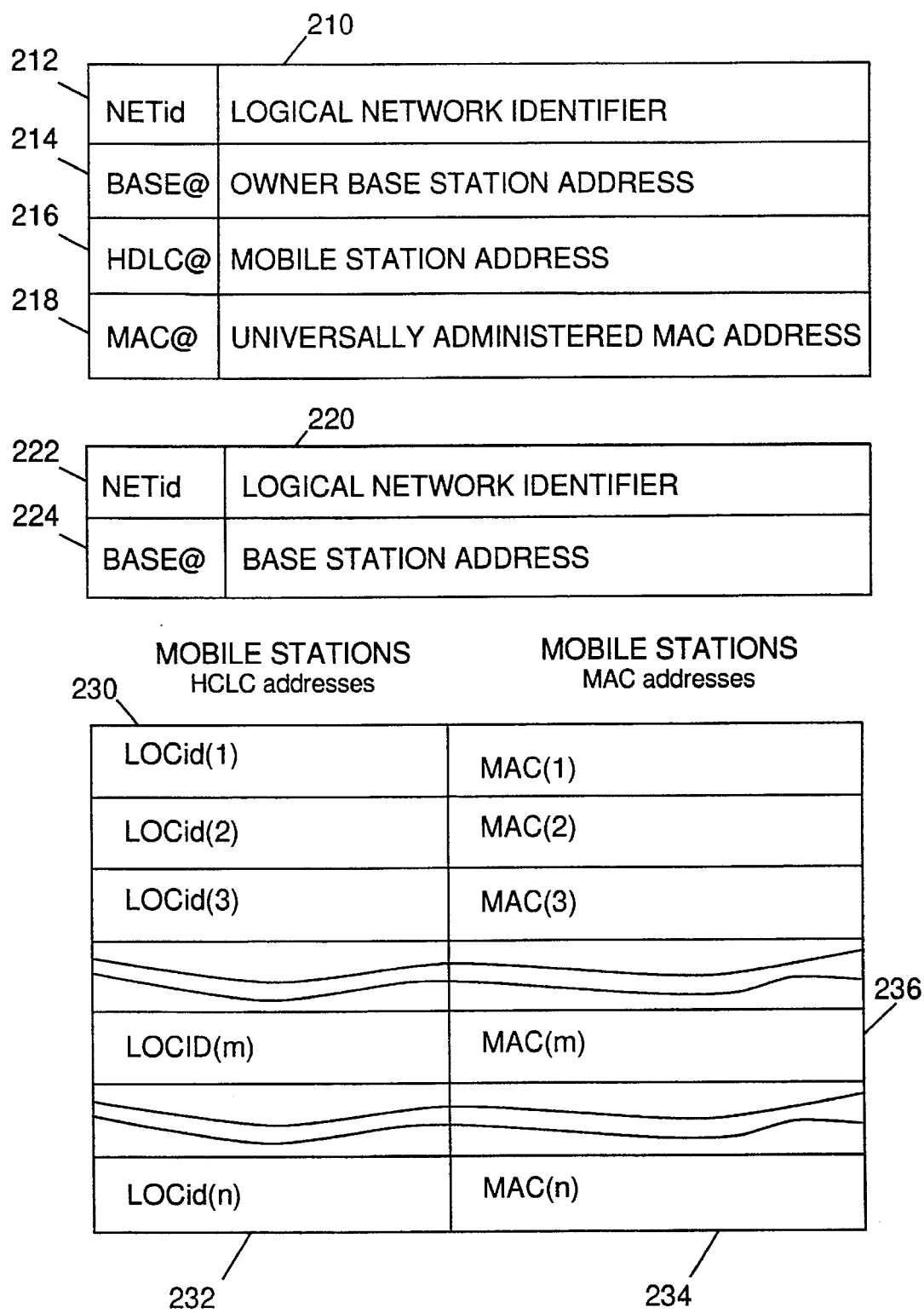
FIG. 2A represents the data structures used by a mobile station and a base station to carry out the method of the invention.

FIG. 2A represents the data structures used by a mobile station and a base station to maintain local knowledge of the currently used logical network identifier, network cell identifier, HDLC address and MAC address. Each mobile station stores in the data storage 68 of its transceiver adapter 44 a set of four addressing parameters 210 comprising: parameter 212 representing the identifier (NETid) of the logical network the mobile station belongs .to, parameter 214 representing the HDLC address (BASE@) of the owner base station controlling the network cell of the mobile station, parameter 216 representing the mobile station HDLC address (HDLC@) and parameter 218 representing the Universally Administered MAC address (MAC@) of the mobile station. Each base station stores in the data storage 68 of its transceiver adapter 36 a set of addressing parameters 220 comprising: parameter 222 representing the identifier (NETid) of the logical network owned by the base station and parameter 224 representing the HDLC address (BASE@) of the base station which is also used as the network cell identifier (CELLid) of the network cell owned by the base station. In addition, each base station maintains a cell members table 230 consisting in a list of n entries (232,234), each entry comprising the local identifiers (LOCid) and the MAC addresses (MAC@) of a mobile station owned by the base station. The cell members table 230 comprises an entry for each one of the mobile stations owned by the base station. Illustratively, in this particular embodiment of the invention, the HDLC address of the mobile stations is used as their local identifier. The cell members table 230 allows the base station to uniquely associate the local identifier and the MAC address of a mobile station owned by the base station.

Figure 3:
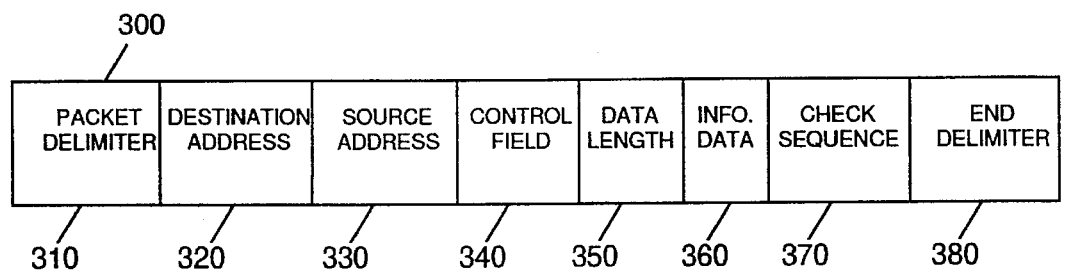
FIG. 3 represents the structure of data and control packets used in this embodiment of the invention.

Referring now to FIG. 3, a suitable HDLC packet structure 300 is shown. A packet delimiter field 310 is followed by a destination address field 320 and a source address field 330. A next packet 300 field is a length field 350 which gives the length in bytes of the following information data field 360. Following the information data field is a check sequence field 370. It should be realized that this format is exemplary only and that a number of suitable formats can be devised. The establishment of an HDLC channel between a registering mobile station 8 and its owner base station 28 corresponds to the allocation by the base station 28 of an HDLC address to the registering mobile station 8 and the addition of an entry in the cell members table 230 carrying in field 232 the HDLC address assigned to registering mobile station 8 and in field 234 the MAC address of registering mobile station 8. In the communication system of the invention, all wireless communication is between a base station and a mobile station. There is no direct communication between mobile units. Inbound packets are sent by a mobile station to a base station, outbound packets are sent by a base station to a mobile station. Control field 340 defines the nature of the HDLC packets and allows to distinguish between several types of packets comprising outbound data packets, inbound data packets, outbound control packets, inbound control packets, data packet acknowledgments (inbound and outbound), outbound control packet acknowledgments and inbound control packets acknowledgments.

U.S. Pat. No. 5,123,029, which is herein incorporated by reference, describes a protocol which is suitable for digital data radio communication in the radio system of the present invention. It is assumed that this protocol is used in this particular embodiment of the present invention. In the frequency hopping spread spectrum system of this protocol, the carrier frequency of the transmitter changes at intervals of time, remaining constant between these instants. The period of constant frequency is called a hop, and it is only during these hops that messages may be exchanged. According to this protocol, each hop is divided into five intervals. The first interval, G, is the interval during which the transmitter carrier frequency is changing. The next interval, X1, is the interval during which the base station broadcast a special message to all the mobile stations identifying the beginning of the following B interval. The B interval is the interval during which only the base station may initiate transmission. The B interval is followed by the X2 interval which is the interval during which the base station broadcasts a special message to all the mobile stations identifying the end of the B interval and, by implication, the beginning of the C interval. The C interval is the interval during which any station may contend for the channel and transmit a message without the consent of the base station. In this protocol, each base station (26, 28) maintains a fixed length superframe structure and operates independently of other base stations. The time duration of a superframe will be denoted as Tsf. In the system illustrating this particular embodiment of the invention, as a superframe consists of 79 frequency hops and each hop lasts for 50 msec., the superframe duration Tsf is 3.95 sec.

Figure 4:
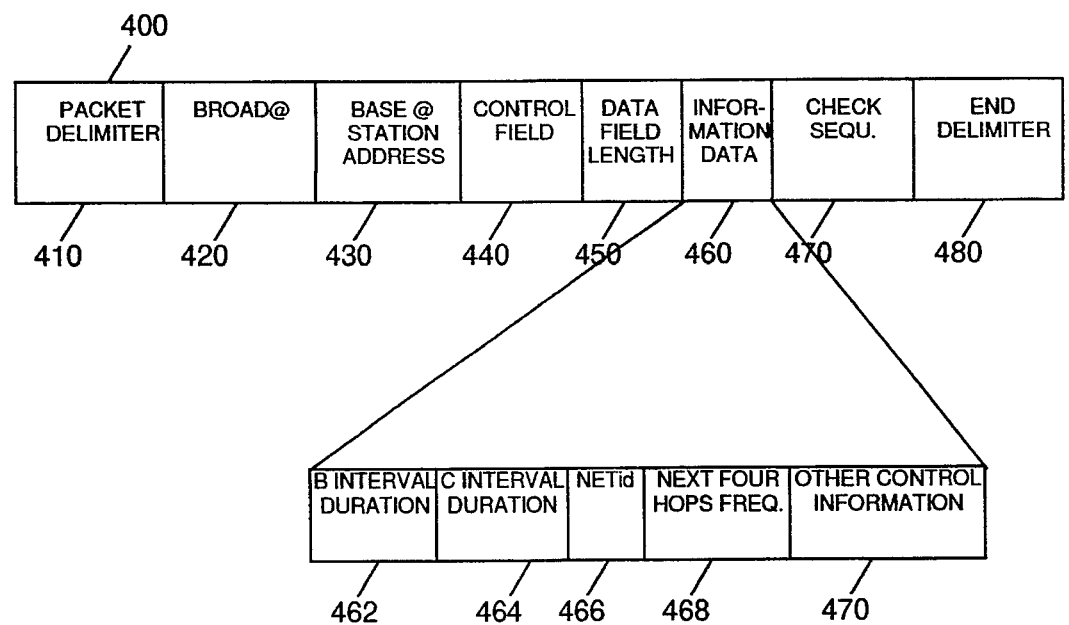
FIG. 4 represents the structure of the header section of a frequency hop.

The HDLC packet of FIG. 4 represents the header section 400 of a hop, sent by each base station at the beginning of each hop, during interval X1. Header section 400 comprises information representative of the duration of B and C intervals, respectively in fields 462 and 464; field 466 carries the network identifier of the network cell controlled by the base station, and field 468 carries information representative of the frequencies of the next four hops. Control field 440 is set to a dedicated value indicating that this packet is the header section of a frequency hop; destination address field 420 carries a predetermined address dedicated to broadcast messages (BROAD@) and source address field 430 carries the address of the base station broadcasting header section 400 (BASE@).

When a registering mobile station 8 is first opened, it does not know who are the surrounding base stations and which frequency hopping patterns they are using. However, it knows the hop duration and the superframe duration Tsf.

Figure 5:
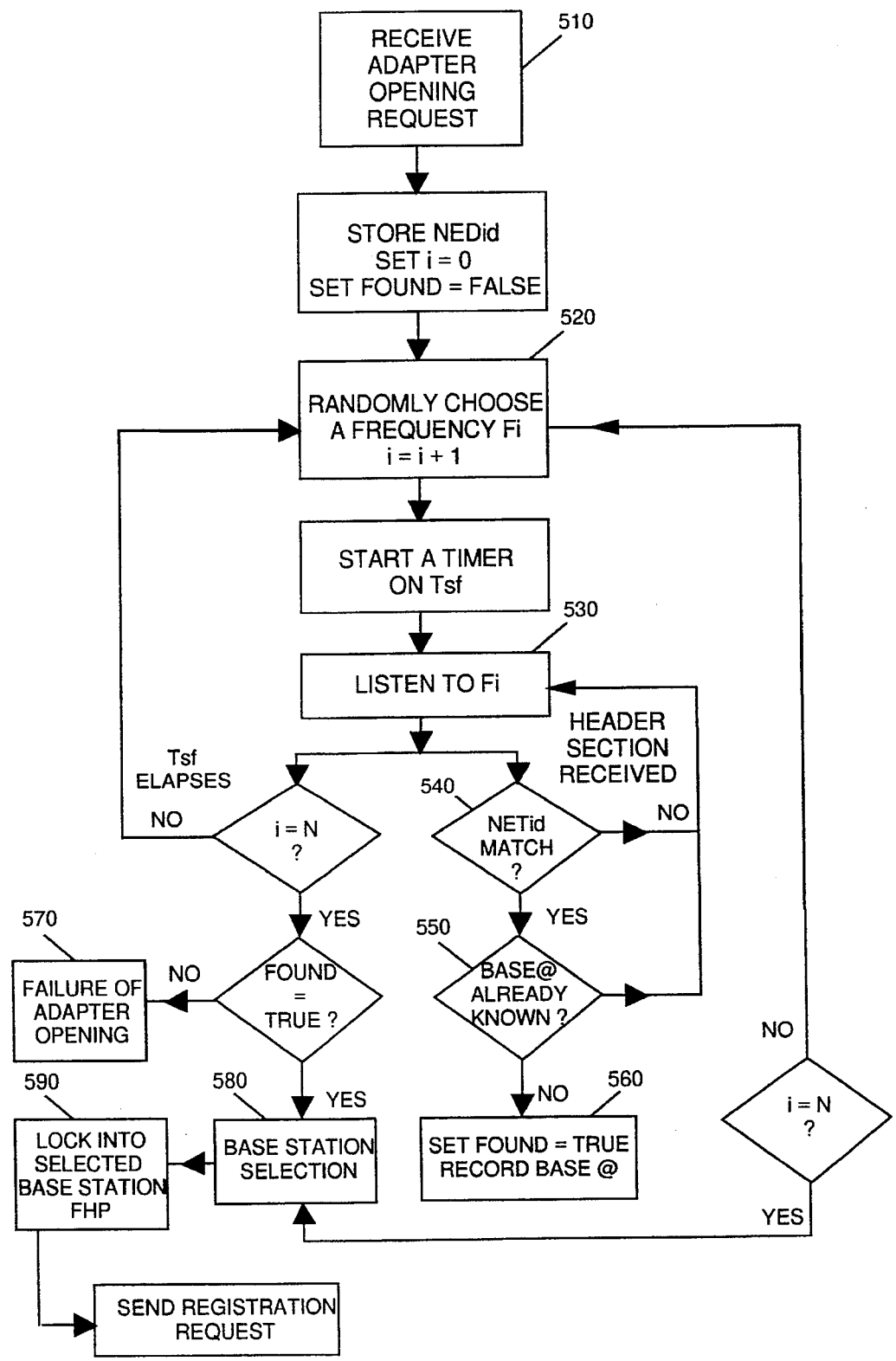
FIG. 5 is a flow chart representing the operations performed by a registering mobile station to identify a base station and send a registration request.

FIG. 5 shows a flow diagram of the process performed by the microprocessor system 56 of the transceiver adapter 44 of a registering mobile station 8 listening to its radio environment when it is first opened. It first receives, as depicted in function block 510, a transceiver adapter opening request from computer 50 via the computer bus interface 52. This opening request comprises the network identifier NETid of the logical network to register in. The microprocessor system 56 of registering mobile station 8 stores NETid in parameter 212 of its set of addressing parameters 210. It is assumed that registering mobile station 8 wants to register in a logical network comprising network cell 2 owned by base station 28 as depicted in FIG. 1. In function block 520, registering mobile station 8 chooses randomly a frequency Fi out of a set of predetermined operating frequencies selected according to U.S. Federal Communications Commission (FCC) in its regulations part 15.247. Mobile station 8 chooses successively a number N of frequencies Fi and goes for each frequency through the following frequency iteration steps,: 520, 530, 540,550, 560. In step 530, registering mobile station 8 listens for the duration of a superframe Tsf to neighboring base stations 26, 28 to receive a valid header section. As depicted in step 540, upon reception of a header section 400, registering mobile station 8 checks, that the network identifier 466 carried in header section 400 matches the network identifier NETid stored in parameter 212. If it does not match, the registering mobile station 8 ignores the header section 400 and keeps listening to the selected frequency Fi until it receives another header section or until the end of the superframe duration. If the network identifier 466 of the received header section corresponds to the NETid stored in parameter 212, the registering mobile station 8 compares, as depicted in step 550, the base station HDLC address 430 carried by the header section 400 with the base station addresses recorded in a list of owner base station candidates identified during previous frequency iterations, if it is already known it means that the same base station was previously found while listening to the registering mobile station radio environment, therefore the process loops back to step 530 and the registering mobile station 8 keeps listening to the same frequency Fi until it receives another header section or until the end of the superframe duration Tsf occurs. If the base station identifier was not previously found, function block 560 is performed: the registering mobile station 8 sets the FOUND variable to the TRUE value, records the base station HDLC address and the strength of the received signal in the list of owner base stations candidates and loops back to function block 520 to select randomly a new frequency. This process is repeated until N random frequencies have been listened to and is followed by a base station selection step 580 taking into account the strength of the signal received from each one of the owner base station candidates. If no base station was found, the transceiver adapter returns a negative response to computer 50 indicating that the adapter opening failed, as represented by step 570. Following the base station selection step the registering mobile station locks into the selected base station frequency hopping pattern as described in function block 590 by listening again to randomly selected frequencies until it receives a header section 400 from the selected base station. It locks into the selected base station frequency hopping pattern by storing in data storage 68 of transceiver adapter 44 the frequencies of the next four hops provided in field 468 of the header section 400. Next the registering mobile station stores the base station HDLC address 430 carried by the header section 400 in addressing parameter 214 and sends a registration request to the selected base station by using the protocol information provided by header section 400 concerning the duration of B and C intervals durations, according to the protocol described in U.S. Pat. No. 5,123,029.

Figure 6:
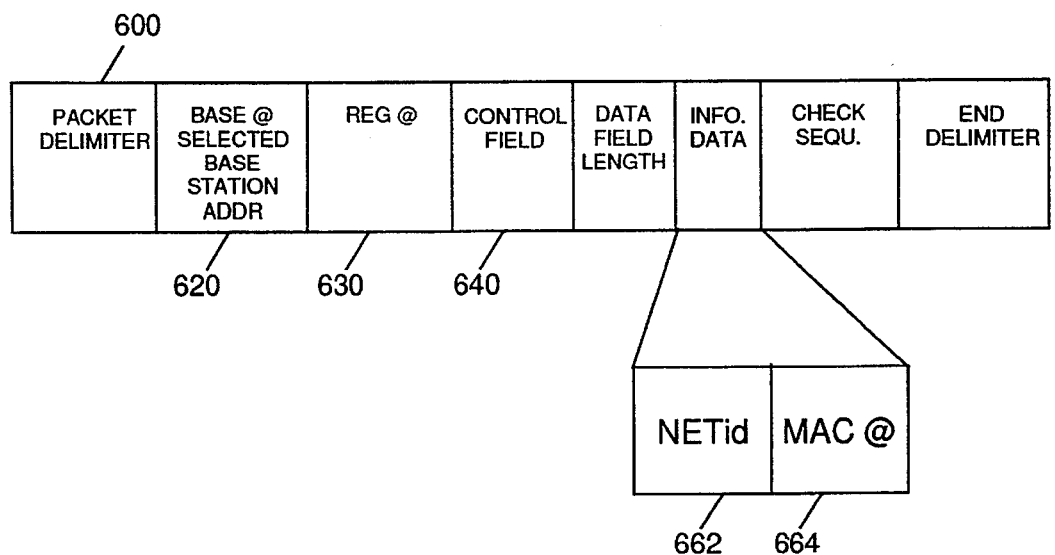
FIG. 6 represents the structure of the registration request sent to a base station by a registering mobile station.

Referring now to FIG. 6, it shows the HDLC packet 600 carrying the registration request sent by a registering mobile station 8 after it has selected a base station 28. Destination address field 620 carries the HDLC address of the selected base station (BASE@), which is also used as the network identifier of the cell controlled by base sattion 28. Source address field 630 carries the predetermined HDLC address dedicated to registering mobile stations (REG@). Control field 640 carries a predetermined dedicated value indicating that this HDLC packet is a registration request from a registering mobile station to a base station. Information data field comprises a first field 662 carrying the network identifier (NETid) of the logical network to register in and a second field 664 carrying the MAC address (MAC@) of the registering mobile station. The values of fields 620 662 and 664 are found respectively in addressing parameters 214, 212 and 218 in data storage 68 of transceiver adapter 44.

Figure 7:
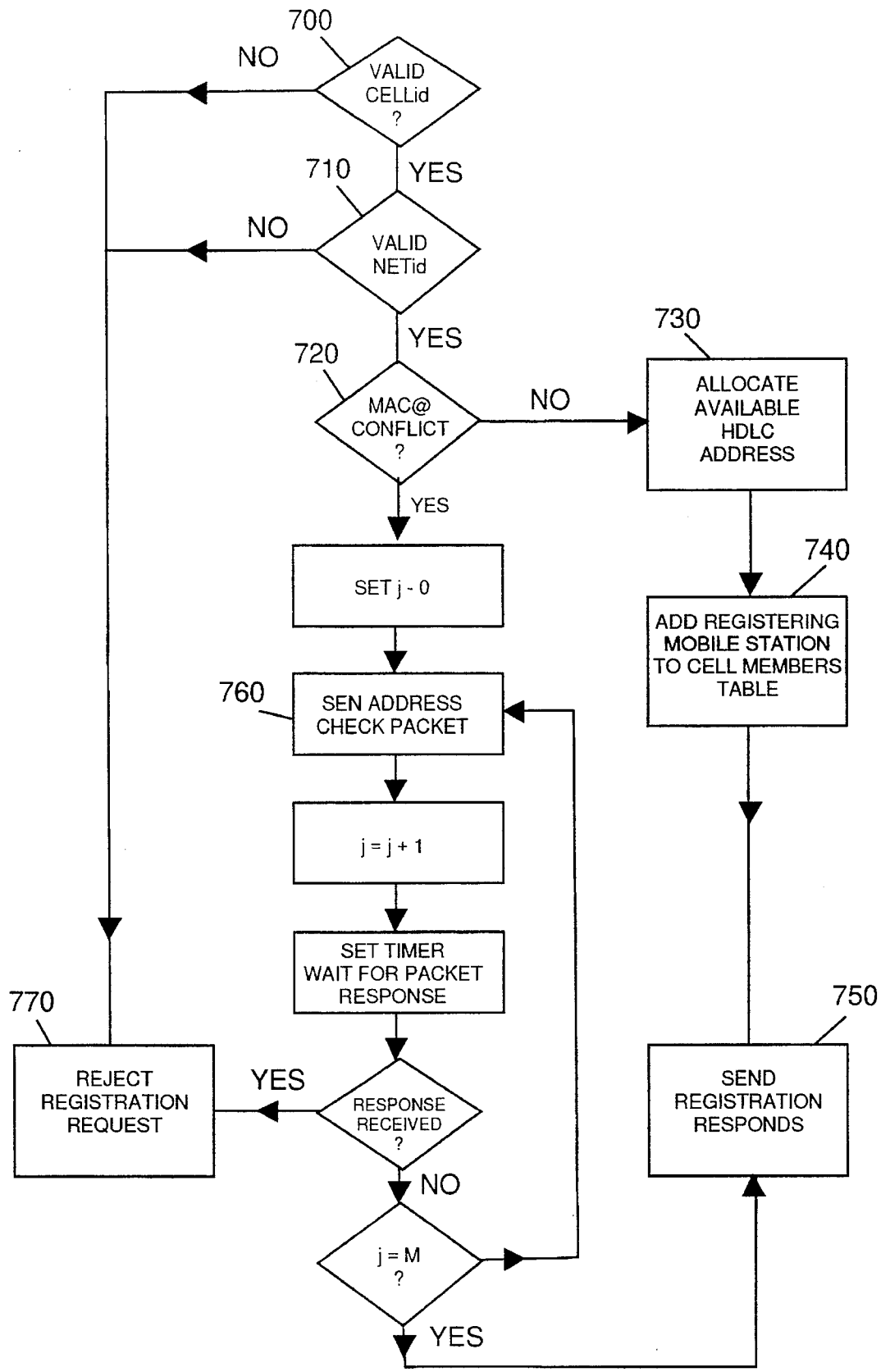
FIG. 7 is a flow chart representing the operations performed by a base station when it receives a registration request from a registering mobile station.

FIG. 7 is a flow diagram of the process performed in the selected base station 28 by the microprocessor system 56 of transceiver adapter 36 upon reception of a registration request 600 from a registering mobile station 8. In function block 700, base station 28 first checks that the destination address 620 carried by the registration request matches its HDLC address stored in addressing parameter 224. It should be noted that BASE@ is used in function block 700 as the network cell identifier (CELLid) of the cell controlled by base station 28. In function block 710, the base station then checks that the network identifier 662 carried by the registration request, matches the network identifier stored in addressing parameter 222. If either destination address 620 or network identifier 662 does not match the request is rejected as represented by function block 770. In the next step 720, base station 28 looks up in its cell members table 230 to detect previously registered mobile stations having the same MAC address (MAC@) as the registering mobile station carried in field 664 of registration request 600. If no conflicting registered mobile station is found, the base station allocates an available HDLC address to the registering mobile station in step 730 and adds, in step 740, an entry (232,234) in its cell members table 230, comprising the allocated HDLC address and the MAC address 664 corresponding to the registering mobile station. In step 750 it sends a registration response 900 (in FIG. 9) to the registering mobile station. Registration response 900 comprises the MAC address 664 of the registering mobile station and the HDLC address allocated to the registering mobile station. If a conflicting entry 236 (in FIG. 2A) is found in the cell members table, the base station sets counter j to 0 and, as depicted in function block 760, sends an address check packet 1000 (in FIG. 10) to the conflicting mobile station corresponding to the conflicting cell members entry 236. Address check packet 1000 comprises the network identifier 222 of the logical network controlled by the base station, the HDLC address of the base station 224, and the HDLC address (LOCid(m)) and the MAC address (MAC(m)) of the conflicting cell members table entry 236. If the base station receives an acknowledgement to its address check packet, it means that another mobile station with the same MAC address as the registering mobile station is still active in the network cell. Therefore, the registration request is rejected as represented by function block 770 by sending a registration response 800 (in FIG. 8). The address check packet may be sent a predetermined number of times M. If the base station, following transmission of the predetermined number of address check packets, has received no acknowledgement, it means that the registered mobile station and the registering mobile station are the same. Consequently, the registration request is accepted and a return is made to function block 750 to send a registration response 900 (in FIG. 9) comprising the MAC address of the registering mobile station and the HDLC address (LOCid(m) ) that had previously been allocated in the conflicting entry 236 of cell members table 230.

Figure 8:
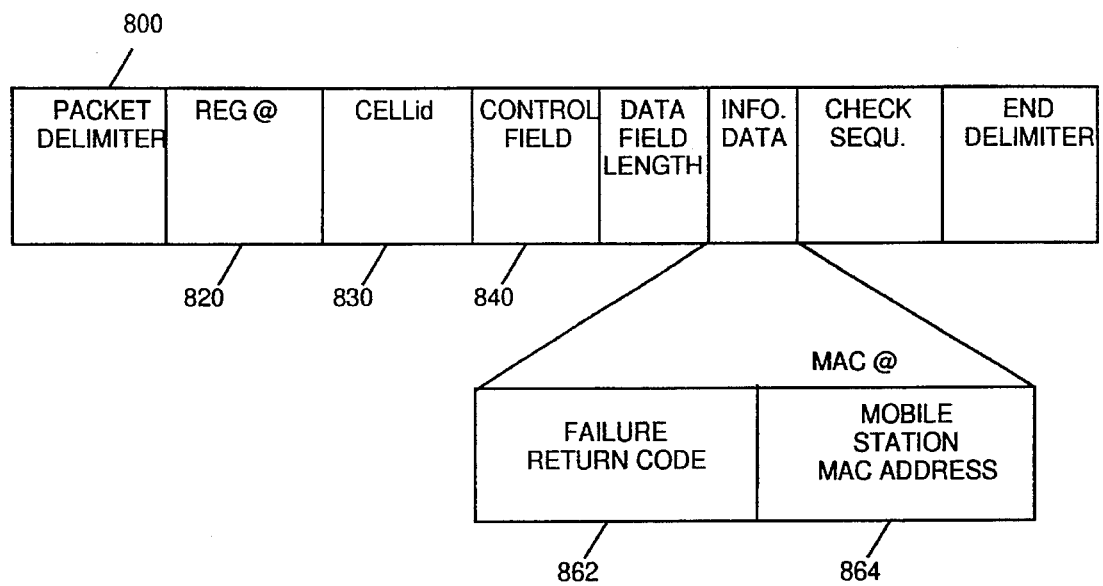
FIG. 8 represents the structure of the packet sent by a base station to reject a registration request.

Referring now to FIG. 8, it describes the structure of the HDLC packet 800 sent by the selected base station when performing function block 770 to reject a registration request. Destination address field 820 is set to the predetermined HDLC address REG@, it is followed by the HDLC address of the selected base station 224 in source address field 830. Information data field 860 comprises a return code in field 862, indicating that the registration request has failed and the MAC address of the registering mobile station MAC@ in field 864. This packet is received by the registering mobile station which first checks that source address field 830 carries the HDLC address of the base station 214 it had selected in function block 580 of FIG. 5; it then checks that field 864 matches its own MAC address stored in addressing parameter 218 of the mobile station, to verify that this packet is a response to its own registration request. Indeed, it may happen that two mobile stations want to register at the same time in which case they are both using the predetermined HDLC address dedicated to registering mobile stations, in such a case both mobile stations receive packet 800 and the presence of the mobile station MAC address allows to discriminate which one of the two mobile stations has been rejected. When source address field 830 does not match addressing parameter 224 of the mobile station receiving packet 800 or when field 864 does not match addressing parameter 218 of the mobile station receiving packet 800, the receiving mobile station ignores packet 800. When both fields match, transceiver adapter 44 of the receiving mobile station returns a negative response to computer 50 indicating that the adapter opening failed.

Figure 9:
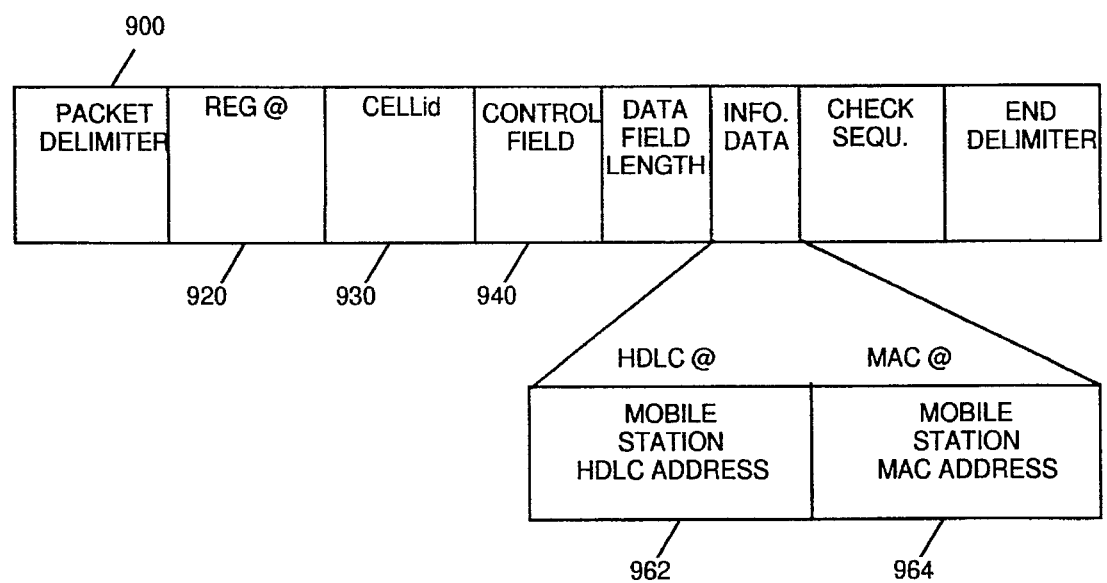
FIG. 9 represents the structure of the packet sent by a base station to accept a registration request.

Referring now to FIG. 9, it describes the HDLC packet 900 sent by the selected base station to the registering mobile station when performing function block 750 to accept the registration request of the mobile station. Destination address and source address fields are set the same way as for packet 800. Control field 940 is set to a predetermined value indicating that this control message sets an HDLC address to a registering mobile station. Field 962 carries the HDLC address (HDLC@) allocated to the registering mobile station. Field 964 carries the MAC address (MAC@) allocated to the registering mobile station. The registering mobile station receiving this packet 900, checks that fields 930 and 964 match respectively the HDLC address of the base station it had selected 214 and its own MAC address 218. If both fields match the registering mobile station accepts the HDLC address carried in field 962 and stores the value of field 962 in addressing parameter 216 If either field 930 or field 964 do not match, the registering mobile station ignores packet 900.

Figure 10:
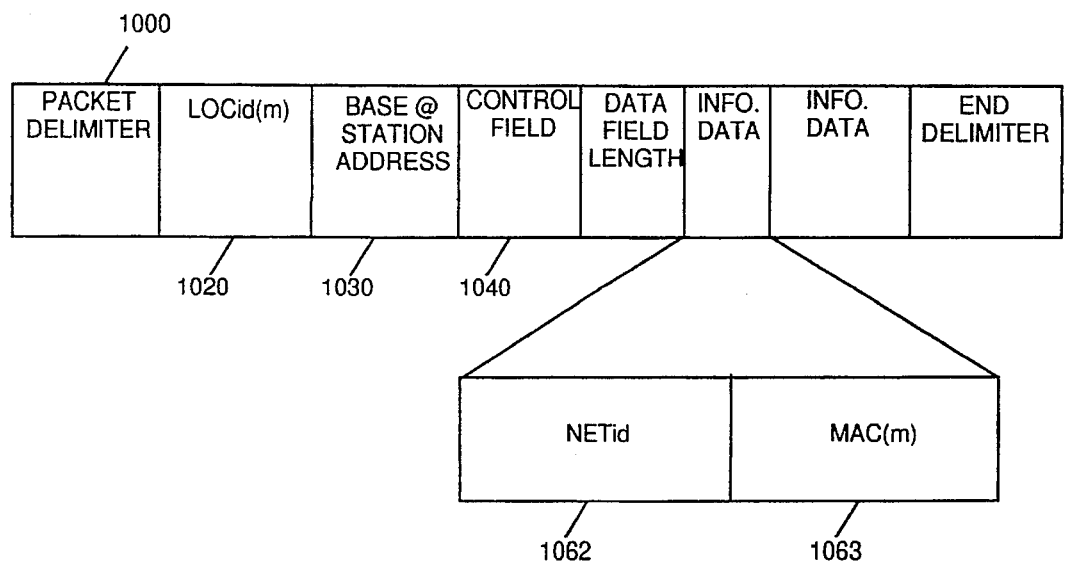
FIG. 10 represents the structure of the address check packet sent by a base station.

FIG. 10 describes the structure of the address check packet sent by the selected base station when performing step 760 to resolve a MAC address conflict between a registering mobile station and an entry in the cell members table 230. Destination field 1020 carries the HDLC address LOCid(m) found in the conflicting entry 263 of the cell members table 230. It is followed by source address field 1030 which carries the HDLC address 224 of the selected base station. Control field 1040 carries a predetermined value indicating that packet 1000 is an address check packet. Information data field 1062 carries the network identifier NETid of the logical network which is found in addressing parameter 222 of transceiver adapter 36. Information data field 1063 carries the MAC address MAC(m) found in the conflicting entry 236 of cell members table 230.

Figure 11:
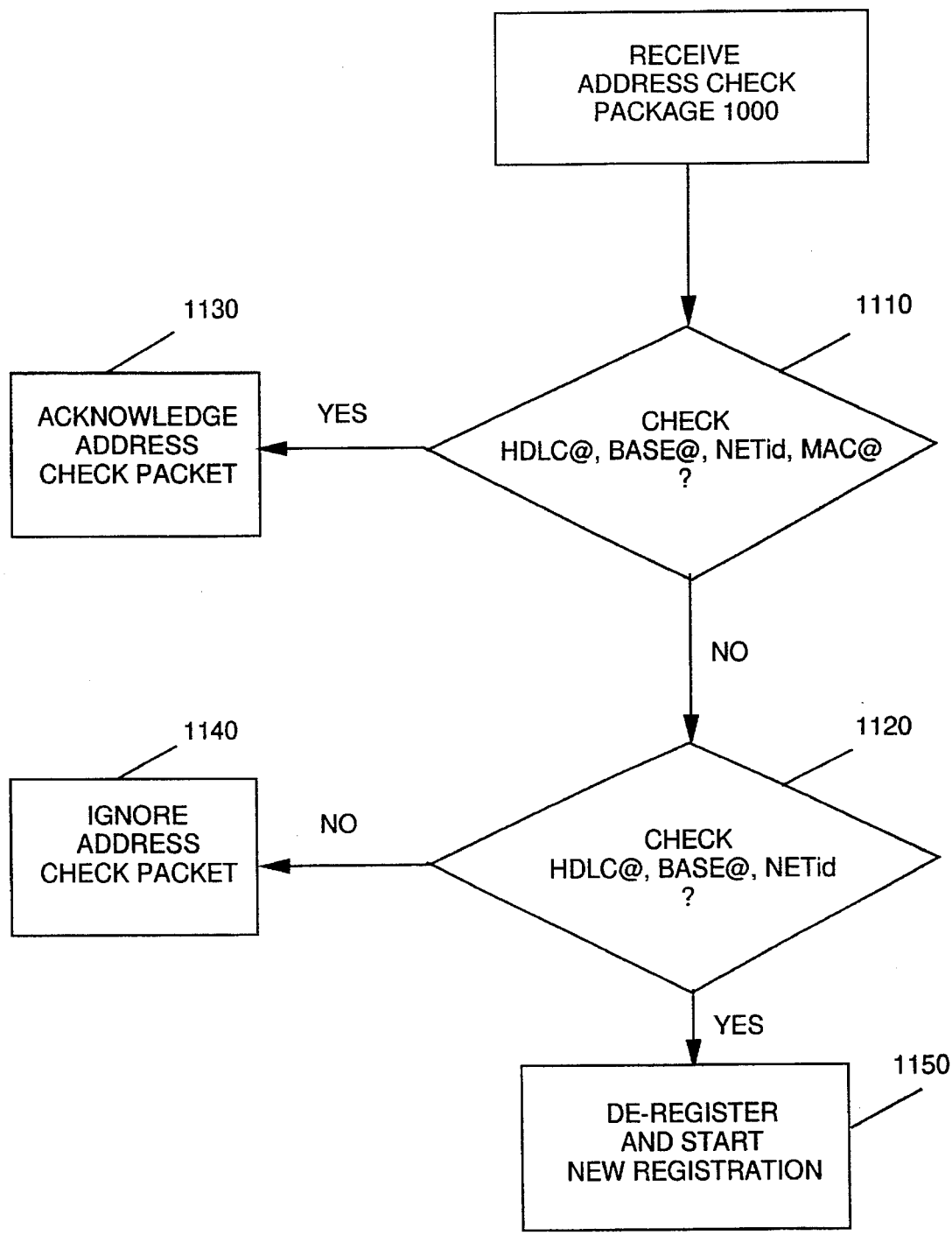
FIG. 11 is a flow chart representing the operations performed by a mobile station upon reception of an address check packet.

FIG. 11 represents the logic flow of the process performed by a mobile station transceiver adapter 44 when it receives an address check packet 1000. In step 1110, it compares fields 1020, 1030, 1062 and 1063 respectively with its own HDLC address 216, the HDLC address of the base station it had selected 214, the network identifier NETid of the logical network it is registered in 212, and its own MAC address 218. If they all match the mobile, station acknowledges the address check packet as depicted in step 1130. If either of the first three fields, i.e. the mobile station HDLC address or the selected base station HDLC address or the logical network identifier, do not match the mobile station ignores the address check packet and does not send any response as depicted in step 1140. If all three fields match but the mobile station MAC address does not match it means that the mobile station is currently using an erroneous HDLC address; there are potentially two different mobile stations in the same network cell which are using the same HDLC address. Therefore the mobile station sends a message to the base station to deregister from the network cell and it initiates a new registration procedure to get a new HDLC address as depicted in function block 1150.

Besides the registration procedure of a mobile station described herein above, another aspect of the present invention is to use the address check packet 1000 of FIG. 10 to detect that a mobile station has stopped participating in a network cell activity and thus that its assigned HDLC address (LOCid), as well as other base station resources, are available and can be assigned to another registering mobile station. Illustratively, a base station can detect inactive mobile station by either monitoring counters representative of the activity of the mobile stations under its control, for instance traffic counters, or by using timers. Once an inactive mobile station has been identified, the base station sends an address check packet 1000 carrying in fields 1020 and 1063, respectively the HDLC address (LOCid) and the MAC address (MAC) associated with the inactive mobile station in the corresponding entry of the base station's cell members table 230. Upon reception of this address check packet, mobile stations perform the process represented in FIG. 11. If the base stations receives an acknowledgement it means that the inactive mobile station is still participating in the network cell activity. If the base station does not receive any acknowledgement to a number of address check packet retries, it means that the inactive mobile station is missing, it does not participate anymore in the network cell activity. Therefore the base station deregisters the inactive mobile station by deleting the cell members table entry corresponding to the inactive mobile station, this way the HDLC address of the inactive mobile station becomes available and can be allocated to a registering mobile station. Similarly, other base station resources such as memory buffers or timers that were allocated to the missing mobile station are released and can be allocated a registering mobile station. This other aspect of the invention allows to promptly detect missing mobile stations and to free corresponding base station resources.

While the invention has been described in terms of a preferred embodiment, those skilled in the art will,recognize that the invention can be practiced with modification within the spirit and scope of the appended claims. For instance, a direct sequence spread spectrum communication channel can be used instead of the frequency hopping described in the preferred embodiment and more generally the communication medium can be an infrared communication channel or any other shared communication channel.

We claim:

1. A method for dynamically registering a new station in a communications system comprising a number of base stations, each base station communicating over a shared communication channel with a plurality of registered stations and controlling a network cell formed by said plurality of registered stations, wherein:

each registered station owns a unique address and is allocated a local identifier, each network cell owns a unique cell identifier known to all registered stations belonging to said each network cell, said each base station manages cell members data uniquely associating the unique address and the local identifier corresponding to each one of said plurality of registered stations;

said method comprising the steps of:

a. send a registration request from said registering new station to a selected base station, said registration request comprising the unique cell identifier of the network cell controlled by said selected base station and the unique address of said registering new station;

b. upon reception of said registration request at said selected base station, detect in said cell members data any conflicting registered station whose said unique address matches the unique address of said registering new station;

1) if no conflicting registered station is detected, accept said registration request, allocate a local identifier to said registering new station and add an entry to said cell members data uniquely associating the unique address and the local identifier of said registering new station;

2) if a conflicting registered station is detected, send an address check packet from said selected base station to said conflicting registered station, said address check packet comprising in a first field the unique address of said conflicting registered station, in a second field the local identifier of said conflicting registered station and in a third field the identifier of the network cell controlled by said selected base station;

c. upon reception of said address check packet at a receiving registered station:

1) compare said first, second and third fields respectively with the unique address, the local identifier and the network cell identifier of said receiving registered station; and 2) if all of said first, second and third fields match, send an acknowledgement to said address check packet, from said receiving registered station to said selected base station.

d. reject said registration request upon reception at said selected base station of an acknowledgement to said address check packet from said receiving registered station.

2. The method of claim 1, wherein step c. further comprises deregistering said receiving registered station from said communication system if said first field does not match and said second and third fields match.

3. The method of claim 1, wherein step c. further comprises ignoring said address check packet if said first field matches and either said second field or said third field does not match.

4. A method for dynamically deregistering inactive stations in a communications system comprising a number of base stations, each base station communicating over a shared communication channel with a plurality of registered stations and controlling a network cell formed by said plurality of registered stations, wherein:

each registered station owns a unique address and is allocated a local identifier, each network cell owns a unique cell identifier known to all registered stations belonging to said each network cell, said each base station manages cell members data uniquely associating the unique address and the local identifier corresponding to each one of said plurality of registered stations;

said method comprising the steps of:

a. detect inactive registered stations;

b. send an address check packet from the base station controlling the network cell of said inactive registered stations, said address check packet comprising in a first field the unique address of said inactive registered station, in a second field the local identifier of said inactive registered station and in a third field the identifier of the network cell of said inactive registered station;

c. upon reception of said address check packet at a receiving registered station:

1) compare said first, second and third fields respectively with the unique address, the local identifier and the network cell identifier of said receiving registered station;

2) if all of said first, second and third fields match, send an acknowledgement to said address check packet, from said receiving registered station to said base station; and 3) if either of said first, second or third field does not match, ignore said address check packet.

d. deregister said inactive registered station if said owner base stations does not receive any acknowledgement to said address check packet after a number of retries.

5. The method of claim 4, wherein step d. comprises deletion by owner base station of the unique address and the local identifier corresponding to said inactive registered station in said cell members data.

6. A system for dynamically registering a new station in a communications system comprising a number of base stations, each base station communicating over a shared communication channel with a plurality of registered stations, each registered station being assigned a unique address, said plurality of registered stations designated as a network cell and being assigned a unique network cell identifier known to said base station and to said plurality of registered stations, wherein each base station manages said network cell members' data uniquely associating for each one of said plurality of registered stations said unique address with a local identifier, said system comprising:

a) means for selecting at said new station a base station as a selected base station and a network cell identifier as a selected network cell identifier;

b) means for sending a registration request from said new station to said selected base station, said registration request comprising said selected network cell identifier and a unique address assigned to said new station;

c) means for detecting in said network cell members' data, upon reception of said registration request at said selected base station, any conflicting registered station whose unique address matches said new station's unique address;

d) means for accepting said registration request when no conflicting registered station is found;

e) means for sending an address check packet from said selected base station to each conflicting registered station, said address check packet comprising in a first field the unique address of each conflicting registered station, in a second field the local identifier of each conflicting registered station and in a third field the network cell identifier of said selected base station;

f) means responsive to receiving said address check packet at said conflicting registered station, comparing said first, second and third fields of said address check packet respectively with the unique address, the local identifier and the network cell identifier of said conflicting registered station and said comparing means sending an acknowledgement of said address check packet from said conflicting registered station to said selected base station if all fields match; and g) means for rejecting said registration request sent by said new station upon receipt at said selected base station of an acknowledgement to said address check packet from one of said conflicting registered stations; whereby said new station is registered when no conflicting registered station is detected, or when no acknowledgement is received at said selected base station in response to said address check packet, and whereby said registration request is rejected when acknowledgement of said address check packet is sent by said conflicting registered station and received at said selected base station.

7. The system as defined in claim 6, wherein means for receiving said address check packet further comprises means for de-registering said conflicting registered station from said communications system if said first field does not match and both said second and third fields match.

8. The system as defined in claim 6 wherein means responsive to said address check packet further comprises means for ignoring said address check packet if said first field matches and either said second field or said third field does not match.

9. A system for dynamically deregistering inactive stations in a communications system comprising a number of base stations, each base station communicating over a shared communication channel with a plurality of registered stations, each registered station being assigned a unique address, said plurality of registered stations, designated as a network cell, being assigned a unique network cell identifier known to said base station and to said plurality of registered stations, wherein each base station manages network cell members' data uniquely associating for each one of said plurality of registered stations said unique address with a local identifier, said system comprising:

means for detecting at one of said base stations an inactive registered station among said plurality of registered stations;

means for sending an address check packet from said base station detecting said inactive registered station to said inactive registered station, said address check packet comprising in a first field the unique address of said inactive registered station, in a second field the local identifier of said inactive registered station and in a third field the network cell identifier of said base station detecting said inactive registered station;

means responsive to said address check packet at said inactive registered station, comparing said first, second and third fields of said address check packet respectively with the unique address, the local identifier and the network cell identifier of said inactive registered station and said comparing means sending an acknowledgement of said address check packet from said inactive registered station to said base station detecting said inactive registered station if all fields match; and means for deregistering said inactive registered station if said base station .detecting said inactive registered station does not receive said acknowledgement after a number of said address check packet retries.

10. The system as defined in claim 9 wherein the means for deregistering said inactive registered station further comprises:

means responsive to said base station detecting said inactive registered station for deleting the unique address and the local identifier corresponding to said inactive registered station in said network cell members' data.

11. A system as defined in claim 6, wherein said shared communication channel is a radio frequency communication channel.

12. A system as defined in claim 6, wherein said shared communication channel is an infrared communication channel.

13. A method for dynamically registering a new station in a communications system comprising a number of base stations, each base station communicating over a shared communication channel with a plurality of registered stations, each registered station being assigned a unique address, said plurality of registered stations designated as a network cell and being assigned a unique network cell identifier known to said base station and to said plurality of registered stations, wherein each said base station manages network cell members' data uniquely associating for each one of said plurality of registered stations said unique address with a local identifier, said method comprising the steps of:

a) selecting at said new station a base station as a selected base station and a selected network cell identifier as a selected network cell identifier;

b) sending a registration request from said new station to said selected base station, said registration request comprising said selected network cell identifier and a unique address assigned to said new station;

c) upon reception of said registration request at said selected base station, detecting in said network cell members' data any conflicting registered station whose unique address matches said new station's unique address; and d) accepting said registration request when no conflicting registered station is found;

e) determining if said conflicting registered station is in said network cell; and f) rejecting said registration request sent by said new station upon determination that said conflicting registered station is in said network, cell; whereby said new station is registered when no conflicting registered station is detected, and whereby said registration request is rejected when a conflicting registered station is determined to be in said network cell.

14. The method of claim 13 wherein the determining step further includes the steps of:

g) sending an address check packet from said selected base station to each conflicting registered station, said address check packet comprising in a first field the unique address of said each conflicting registered station, in a second field the local identifier of said each conflicting registered station and in a third field the network cell identifier of said selected base station;

h) receiving said address check packet at said conflicting registered stations, comparing said first, second and third fields of said address check packet respectively with the unique address, the local identifier and the network cell identifier of the conflicting registered station and sending an acknowledgement of said address check packet from said conflicting registered station to said selected base station if all fields match; and wherein the rejecting step further includes the step of:

i) rejecting said registration request sent by said new station upon receipt at said selected base station of an acknowledgement to said address Check packet from one of said conflicting registered stations.

15. The method of claim 14 wherein step h) further comprises deregistering said conflicting registered station from said communications system if said first field does not match and both said second and third fields match.

16. The method of claim 14 wherein step h) further comprises ignoring said address check packet if said first field matches and either said second field or said third field does not match.

17. A method for dynamically deregistering inactive stations in a communications system comprising a number of base stations, each base station communicating over a shared communication channel with a plurality of registered stations, each registered station being assigned a unique address, said plurality of registered stations, designated as a network cell, being assigned a unique network cell identifier known to said base station and to said plurality of registered stations, wherein each base station manages network cell members data uniquely associating for each one of said plurality of registered stations said unique address with a local identifier, said method comprising the steps of:

a) detecting at one of said base stations an inactive registered station among said plurality of registered stations;

b) sending an address check packet from said base station detecting said inactive registered station to said inactive registered station, said address check packet comprising in a first field the unique address of said inactive registered station, in a second field the local identifier of said inactive registered station and in a third field the network cell identifier of said base station detecting said inactive registered station;

c) receiving said address check packet at said inactive registered station, comparing said first, second and third fields of said address check packet respectively with the unique address, the local identifier and the network cell identifier of said inactive registered station and sending an acknowledgement to said address check packet from said inactive registered station to said base station detecting said inactive registered station if all fields match; and d) deregistering said inactive registered station if said detecting base station does not receive said acknowledgement after a number of said address check message retries.

18. The method of claim 17 wherein step d) comprises deletion by said base station detecting said inactive registered station of the unique address and the local identifier corresponding to said inactive registered station in said network cell members' data.

* * * * *

UNITED STATES PATENT AND TRADEMARK OFFICE
CERTIFICATE OF CORRECTION

PATENT NO.  :   5,519,706
DATED       :   May 21, 1996
INVENTOR(S) :   D. Bantz et al It is certified that error appears in the above-identified patent and that said Letters Patent is hereby corrected as shown below:

On the title page, item [75]:

Inventors: David Bantz, Chappaqua, New York; Frederic Bauchot,
          St. Jeannet France; Michelle M. Wetterwald, Cagnes
          Sur Mer France; Kadathur Natarajan, Millwood New York;
          Hamid Ahmadi, Somers New York.

Signed and Sealed this

Seventh Day of October, 1997

Attest:

BRUCE LEHMAN

*Attesting Officer*   *Commissioner of Patents and Trademarks*